May 7, 1963 F. D. EZEKIEL ETAL 3,088,744
SUBMARINE PROPELLER SHAFT SEAL
Filed Aug. 23, 1960 3 Sheets-Sheet 1

INVENTORS
FREDERICK D. EZEKIEL
GEORGE F. CORCORAN
R. LANGDON WALES
BY
KENWAY, JENNEY, WITTER & HILDRETH
ATTORNEYS

May 7, 1963 F. D. EZEKIEL ETAL 3,088,744
SUBMARINE PROPELLER SHAFT SEAL

Filed Aug. 23, 1960 3 Sheets-Sheet 3

INVENTORS
FREDERICK D. EZEKIEL
GEORGE F. CORCORAN
R. LANGDON WALES
BY
KENWAY, JENNEY, WITTER & HILDRETH
ATTORNEYS

United States Patent Office 3,088,744
Patented May 7, 1963

3,088,744
SUBMARINE PROPELLER SHAFT SEAL
Frederick D. Ezekiel, Waltham, George F. Corcoran, Littleton, and R. Langdon Wales, Lincoln, Mass., assignors to Northrop Corporation, Beverly Hills, Calif., a corporation of California
Filed Aug. 23, 1960, Ser. No. 51,429
11 Claims. (Cl. 277—3)

This invention relates to an improved pressure-balanced fluid seal, and is particularly adapted for sealing a shaft which is subject to relative canting, lateral and axial displacement as well as rotational movement, while providing an effective seal against the flow of a highly pressurized fluid along the shaft. The improved seal is particularly intended for use with a propeller shaft in a submarine, whose shaft opening must be sealed against widely varying external fluid pressures, and in which the shaft is subject to substantial lateral, canting, and axial deflection and displacement. However, the advantages of the invention may be realized in various other applications where high or varying pressure differentials across a seal are encountered, or in which a rotating shaft is subject to random displacements.

It is accordingly an object of my invention to provide an improved pressure-balanced fluid seal which is effective to prevent the flow along a shaft of a fluid, even though the seal is subjected to widely varying pressure differentials on opposite sides thereof.

It is a further object of my invention to provide an improved pressure-balanced fluid seal which is effective to prevent the flow of fluid along a shaft which is subject to lateral, canting, or axial displacement.

This invention contemplates the provision of a flow of hydraulic fluid whose pressure is automatically regulated to be substantially equal to that of the fluid which is to be sealed, although this pressure may vary widely. A conventional resilient sealing element designed to withstand only a relatively small pressure differential, is imposed about the shaft between the hydraulic fluid and the fluid to be sealed, and affords effective sealing because of the substantial equality of the fluid pressures exerted upon its opposite axial faces.

The flow of hydraulic fluid is bled from the sealing element to the pressure prevailing in a low pressure area on one side of the seal, by means of an annular sleeve circumferentially spaced about the shaft and forming a small clearance annular passageway therebetween. This passageway receives the flow of hydraulic fluid under high pressure from the sealing element and bleeds the fluid to the lower pressure. The pressure drop represents flow work and conversion to velocity head in the passageway, and is independent of the viscosity of the hydraulic fluid; however, the rate of flow is inversely related to the viscosity, and it is therefore preferred to use a hydraulic fluid of high viscosity, such as oil.

In applications in which a shaft is subjected to random lateral, canting, or axial displacements, frictional damage would occur and sealing action might be interrupted if the sleeve were supported in such a manner that the hydrostatic action of the hydraulic fluid in the passageway could not maintain the small clearance of the sleeve from the shaft. It is a feature of my invention that improved resilient and hydraulic means are provided for axially supporting the sleeve in balanced relation in the improved seal previously referred to, together with improved hydraulic means for radially supporting the sleeve upon the shaft, such as to maintain the circumferentially spaced-apart relation of the sleeve about the shaft although the shaft is subject to random displacements. These means suspend the sleeve in such a manner that it follows the random lateral and canting displacements of the shaft, and metal-to-metal contact between these members is prevented.

The interior surface of the sleeve forms an annular passageway about the shaft which tapers from a larger diameter at an end receiving the hydraulic fluid at the regulated higher pressure, to a smaller diameter at the end at which the hydraulic fluid is delivered under a reduced pressure. The tapered form of the passageway causes a self-centering force to be exerted between the sleeve and the shaft, which urges the sleeve to follow canting or lateral displacements of the shaft. This force is complementary to the hydrostatic self-centering force of the hydraulic fluid induced by rotation of the shaft, which would be exerted even in a cylindrical passageway, and the two forces are combined during shaft rotation to support the sleeve radially on the shaft and to maintain their circumferentially-spaced apart relation. The self-centering force due to the taper is in itself effective to achieve this purpose when the shaft is stationary.

The means provided for axially supporting the sleeve permit free play of the hydraulic radial support of the sleeve upon the shaft by the operation of the passageway. These means comprise resilient members axially interposed between the sleeve and the housing, together with an arrangement of surfaces of the sleeve for hydraulic axial balancing by the opposing pressures of hydraulic fluid and the high pressure fluid which is to be sealed against flow along the shaft. By these means, the sleeve is axially balanced in a housing but is nevertheless free to be canted or laterally displaced according to the random movements of the shaft. The seal also permits axial displacement of the shaft relative to the housing and the sleeve without interfering with the sealing action of the sealing element and the functioning of the sleeve.

Further objects and advantages of the invention will become apparent as the following detailed description of illustrative embodiments proceeds, referring to the accompanying drawings, in which.

Figures 1, 2:
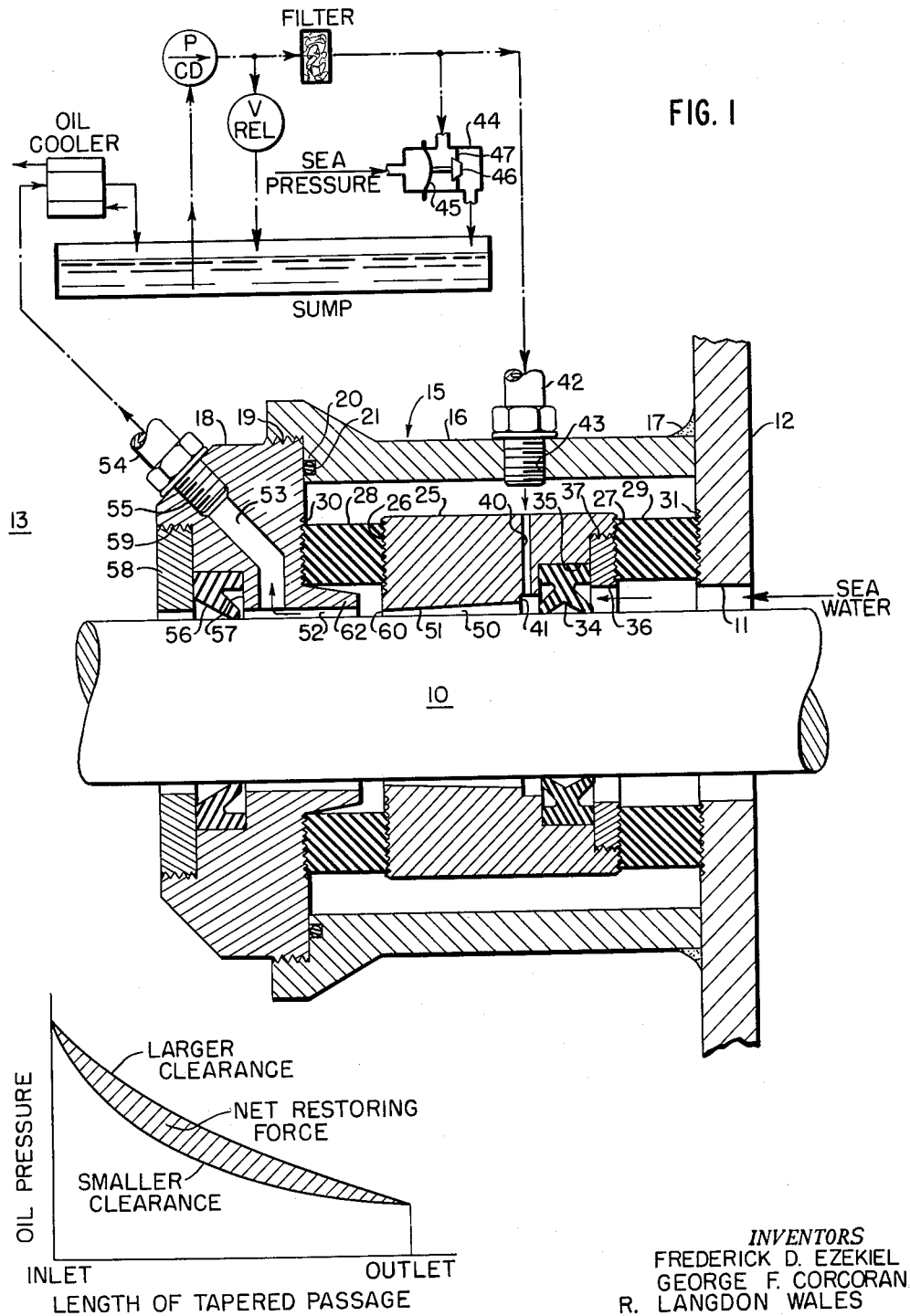
FIG. 1 is a sectional view in elevation of a seal made according to a first embodiment of the invention, together with a schematic illustration of the hydraulic circuit thereof.
FIG. 2 is a diagram illustrating the distribution of oil pressure along the tapered passageway of the seal and the resulting self-centering action of this passageway.

Referring to FIG. 1, a first embodiment of the improved seal is shown in operative relationship with a submarine propeller shaft 10, which projects through a shaft opening 11 formed in a pressure hull 12 and into the surrounding sea. Sea water enters the interior of the hull through the shaft opening, and it is the function of the seal to prevent its flow along the shaft 10 into the relatively low pressure area 13, representing the interior of the submarine. The shaft is subject to random axial, lateral, and canting movement, and this renders the problem of sealing out the sea water particularly difficult; furthermore, vertical movement of the submarine subjects the seal to widely varying and often very high sea water pressures. The improved seal is shown in this environment in order to illustrate the difficulties which it is particularly adapted to overcome, but it will be apparent that the seal is adapted for various applications in environments in which either of the aforementioned problems arise, and is not limited in scope to the sealing of submarine propeller shafts.

The seal includes housing means generally designated 15, comprising an annular casing 16 secured to the hull by a weld 17, and a cap 18 threaded at 19 into the opposite end of the casing 16. A resilient O-ring seal 20 is interposed between the casing and the cap in a circular groove 21 to prevent leakage of hydraulic fluid from the housing.

An annular sleeve member 25 is located within the housing, and is circumferentially spaced about the shaft 10. The sleeve is roughened upon its opposite radial end surfaces 26 and 27 for gripping a pair of resilient annular members 28 and 29, respectively, which are formed of rubber or other resilient material. The resilient members are axially interposed between the sleeve and roughened surfaces 30 and 31 of the cap 18 and the hull 12, respectively, to support the sleeve in balanced axial relationship to the housing while permitting canting and radial movement of the sleeve.

A conventional sealing ring element 34 circumferentially engages the shaft, and is retained in an annular recess 35 of the sleeve by means of a ring 36 forming a portion of the sleeve and threaded therein at 37. The sealing element is of an inexpensive type adapted to sustain only a relatively small pressure differential across its axial faces, and is formed of rubber or other resilient material. The cross-sectional form of the element is not critical; for example, a cylindrical rubber or carbon seal may alternatively be used.

The sealing element is subjected on one axial face thereof to the sea pressure, and on the other axial face to a flow of hydraulic fluid under a regulated pressure substantially equal to the sea pressure. The very low differential pressure upon the opposite faces of the sealing element results in effective sealing action although the sealing element is of a low-pressure type. The hydraulic fluid, which is preferably oil or other fluid of relatively high viscosity, is supplied to the sealing element by means of a bore 40 and an annular recess 41 formed in the sleeve 25, which are in fluid communication with a supply tube 42 threaded into an opening 43 formed through the casing 16.

The hydraulic circuit is shown schematically, and includes a constant displacement pump of any suitable type, which delivers hydraulic fluid through the filter at a pressure at least equivalent to the highest sea water pressure which is to be encountered in a submarine application. A relief valve is provided for emergency release of excessive pressure to an oil sump. The pressurized oil passes through the filter and thence to the supply tube 42 for delivery to the interior of the housing 15. Pressure regulation is obtained by means of a regulating valve 44 of conventional design, which is regulated by sea pressure to relieve pressure of the hydraulic fluid in excess of the sea pressure, by draining hydraulic fluid to the sump. The transient response of the valve to changes in sea water pressure following vertical movement of the submarine need not be rapid, because the sealing element is capable of withstanding moderate pressure differentials without leakage. Therefore, a relatively simple diaphragm actuated valve is preferably employed as the regulating valve, as illustrated. The valve 44 includes a diaphragm 45 subjected on its opposite sides to sea pressure and hydraulic fluid pressure. A valve member 46 is drivingly connected with the diaphragm for cooperation with a valve seat 47, which closes communication of the tube 42 with the sump when the hydraulic fluid pressure is equivalent to the sea pressure. The hydraulic fluid pressure supplied by the pump, if in excess of the sea pressure, opens the valve member 46 to bleed hydraulic fluid to the sump and thus regulate the pressure supplied to tube 42 to be equal to the sea pressure, even though the latter may vary between wide limits.

The hydraulic fluid, after reaching the annular recess 41 and an axial face of the sealing element 34, is discharged through a small clearance annular passageway 50, which is formed between the shaft 10 and a circular bore 51 formed longitudinally through the sleeve 25. The flow is then drained from the seal through a cylindrical bore 52 formed about the shaft in the cap 18, a passage 53, and a drain tube 54 threaded into the cap at 55. In order to prevent leakage of the fluid from the housing, a conventional resilient annular sealing element 56 is received in a recess 57 formed in the cap, and is retained therein by means of a ring 58 threaded into the end cap at 59. The flow is passed through an oil cooler and returned to the sump under the pressure prevailing in the area 13, representing the interior of the submarine. It will thus be apparent that the pressure of the hydraulic fluid prevailing at an end 60 of the passageway 50 is the pressure of the interior of the submarine. The pressure drop which occurs along the passageway is independent of the viscosity of the hydraulic fluid, but the rate of flow required to maintain the pressure differential along the passageway is inversely related to the viscosity. It is therefore preferable to use a hydraulic fluid of relatively high viscosity, such as oil.

If the bore 51 is cylindrical in form it will provide a substantial self-centering hydraulic action between the sleeve 25 and the shaft in view of the small clearance of the passageway between these members. However, increased self-centering action is obtained by tapering the bore from the end of the passageway joining the recess 41, to a smaller diameter at the other end 60. In order to obtain the self-centering action, it is essential that the larger radial clearance be placed at the high-pressure end of the passageway, and not at the lower pressure end; if the taper were reversed, a de-centering force would be exerted which would cause the sleeve to rub the shaft. The self-centering action of the tapered clearance is illustrated by the diagram of FIG. 2, in which oil pressure is plotted over the length of the passage from the inlet to the outlet. The diagram assumes that there is initially a slight misalignment of the sleeve with the shaft, forming different radial clearances along diametrically opposed longitudinal flow paths. The oil pressure along these two paths is designated by the "smaller clearance" curve and the "larger clearance" curve. It will be apparent that the oil pressure drop from the inlet to the outlet is the same in both paths, but pressure drops more rapidly along the smaller clearance path. Consequently an unbalanced net restoring force, represented by the shaded area between the curves, arises in a direction to re-center the sleeve by equalizing the clearances. This phenomenon is more fully explained in an article entitled "Lateral Forces On Hydraulic Pistons," by J. F. Blackburn, Transactions of the ASME, page 1175, August 1953.

Referring again to FIG. 1, the sleeve 25 is axially supported in a resilient manner by the annular members 28 and 29 such that the sleeve is free to follow random lateral and canting movements of the shaft, and to be centered with respect to the shaft by the action of the fluid flow in the passageway 50. Furthermore, the sleeve is axially balanced in the housing in a manner which does not interfere with the sealing action during random axial movements of the shaft. The axial balancing action of the members 28 and 29 is augmented by the balancing effect of hydraulic fluid exerted upon the end surfaces 26 and 27 of the sleeve, both directly and through compression of the members 28 and 29. However, a slight imbalance may exist due to the exertion of the higher hydraulic pressure upon radial surfaces of the recesses 35 and 41, and the lower pressure upon the radially inner portion of the surface 26. This unbalanced force is not sufficient to interfere with the axial balance of the sleeve, which is achieved by a slight increase of the compression of the resilient member 28. In order to support radially inward compression of the member 28 due to the difference in hydraulic pressures exerted upon the inner and outer cylindrical faces of this member, an axially extending flange 62 is formed on the end cap 18.

Figure 3:
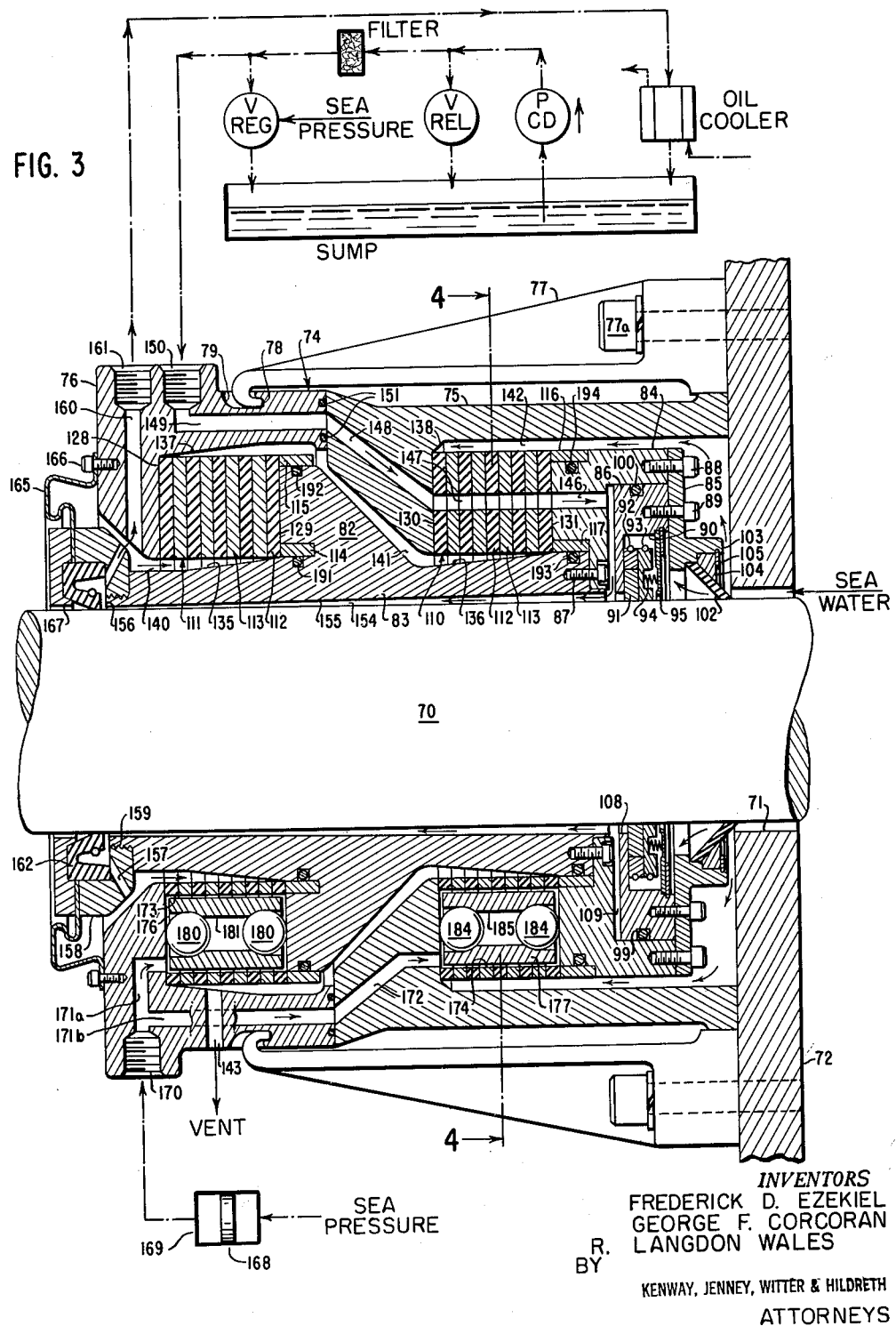
FIG. 3 is a sectional view in elevation of a seal made according to a further embodiment of the invention, together with a schematic illustration of the hydraulic circuit thereof.
Figure 4:
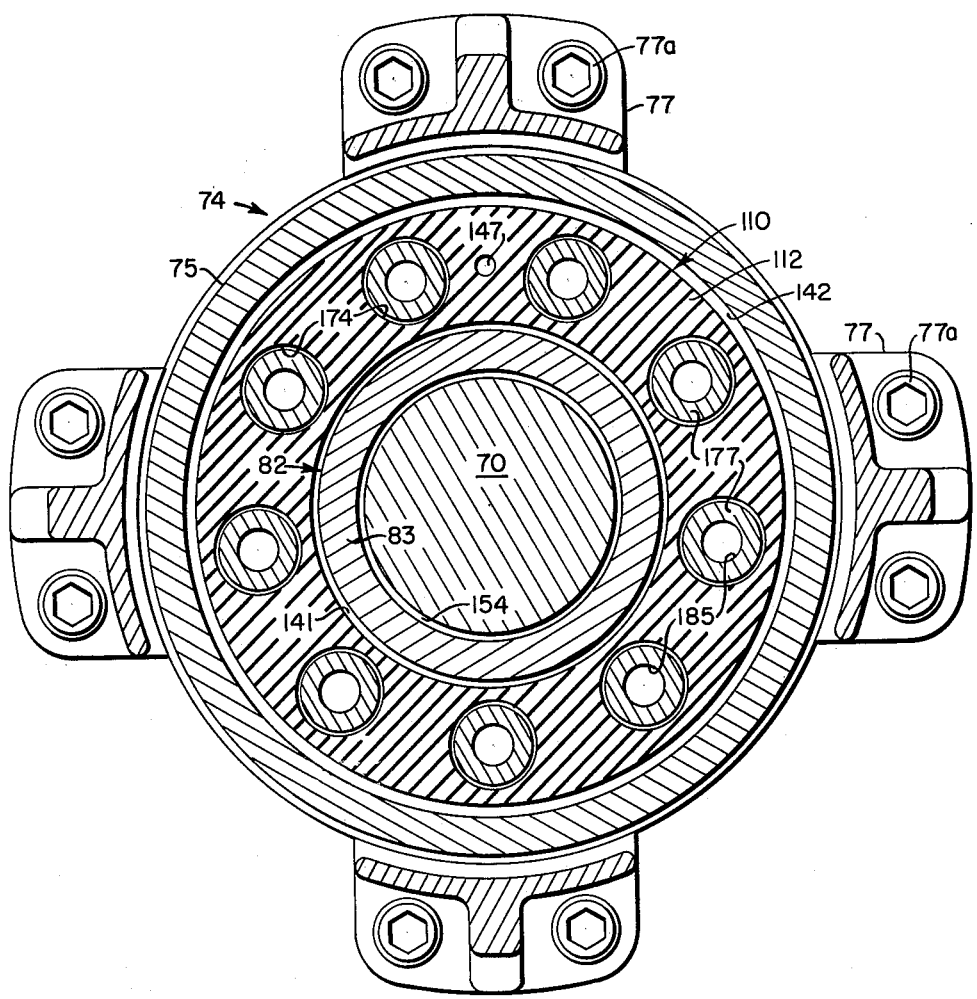
FIG. 4 is a sectional end view of the seal of FIG. 3, taken along line 4—4, looking in the direction of the arrows.

Referring to FIGS. 3 and 4, another embodiment of my improved seal is shown, in which modified resilient means for axially supporting a sleeve member are shown, together with improved means for hydraulically balancing the sleeve in an axial direction while accommodating lateral or canting movement of the sleeve with respect to housing means. In this embodiment, a submarine propellor shaft 70 projects through an opening 71 formed in a pressure hull 72. Sea water enters the opening 71, and passes interiorly thereof as shown by the arrows. The seal includes housing means generally designated 74, comprising an annular casing 75 and an end cap 76. The end cap axially abuts the casing and these members are secured in sealing engagement with the pressure hull by means of a plurality of circumferentially spaced brackets 77, which are bolted to the hull by bolts 77a. Each of the brackets is formed at its outer end with a hook portion 78 engaging a recess 79 suitably formed in the end cap.

A sleeve member generally designated 82 is circularly disposed about the shaft within the housing, and includes a sleeve element 83, an annular element 84, a ring 85 and a supporting member 86. These members are secured to form a unitary sleeve member by means of a plurality of machine screws 87, 88 and 89. The member 86 is formed with a recess 90 to receive an annular three-ring carbon seal 91 in circumferential slidable engagement with the shaft 70. The carbon seal is of a well-known type designed to sustain only moderate pressure differentials upon its opposite axial faces, and is biased into engagement with the shaft by means of a pair of annular springs 92 and 93. The carbon seal is axially biased in the recess 90 by means of a plurality of compression springs 94 which are interposed between the carbon seal and a retaining disc 95 supported by the member 86. About its outer periphery, the member 86 is formed with an annular groove 99 receiving an O-ring seal 100, to prevent fluid leakage between the element 84 and the member 86. A frusto-conical resilient washer 102 circumferentially engages the shaft in slidable relationship, and is mounted in an axial flange 103 of the ring 85 by means of a conforming washer 104 and a snap-ring 105.

The member 86 is formed with a central opening 108 to permit hydraulic fluid under a pressure equal to that of the sea water to exert a balancing pressure on the inner axial face of the carbon seal. The member 86 is mounted in axially spaced relation to the element 84 to form a radial hydraulic fluid passage 109 therebetween.

A pair of resilient annular disc assemblies generally designated 110 and 111, are provided for axially supporting the sleeve 82 in the housing 74. The disc assemblies are each formed of a plurality of resilient rings 112 alternately stacked with relatively rigid rings 113. The rings 112 and 113 may be formed of rubber and metal respectively, and are bonded to form a unitary structure which will accommodate lateral or twisting deflection while providing axial support. The disc assembly 111 further includes a pair of concentric rings 114 and 115 bonded to an end ring 112 thereof, and the disc assembly 110 includes concentric rings 116 and 117 bonded thereto in a similar manner. These rings aid in retaining the disc assemblies in assembled relationship with the sleeve 82. The disc assembly 111 is bonded at opposite ends thereof to a radial face 128 formed in the cap 76, and to a radial face 129 formed in the sleeve element 83. Similarly, the disc assembly 110 is bonded at opposite ends thereof to a radial face 130 formed in the cap 75, and to a radial face 131 formed in the element 84. The sleeve is formed with tapered surfaces 135 and 136, the cap 76 is formed with a tapered surface 137, and the casing 75 is formed with a tapered surface 138, such that the disc assemblies are radially supported only at opposite ends of the inner and outer peripheries thereof. The sleeve 82 and the housing 74 are thus circumferentially spaced apart to form annular clearance spaces 140, 141 and 142 therebetween. By these means, the sleeve 82 is free to move laterally or to cant with respect to the housing, limited only by the resilient action of the disc assemblies, and may follow the random lateral and canting displacements of the shaft 70. The clearance space 141 is vented to the ambient pressure within the hull 72 by means of a port 143, in order to freely accommodate changes in volume of this clearance space resulting from relative movement of the sleeve with respect to the housing.

A flow of hydraulic fluid is supplied through the opening 108 to an axial face of the carbon seal 91 by means of the passage 109, and further passages 146 in the element 84, 147 in the disc assembly 110, 148 in the casing 75, 149 in the cap 76, and a threaded opening 150 communicating with the exterior of the housing. The hydraulic fluid is supplied by means of a supply system which is schematically illustrated and is substantially the same as that shown in FIG. 1. Leakage from the passages 148 and 149 at the abutting faces of the casing 75 and the cap 76 is prevented by means of a pair of concentric O-ring seals 151 placed between the axially abutting faces. The flow is further restrained from escape between the member 86 and the element 84 by means of the O-ring seal 100.

The flow of hydraulic fluid and the sea water pressure exert substantially equal pressures upon opposite faces of the carbon seal 91, which is thus effective to prevent the flow of sea water along the shaft. The flow of hydraulic fluid is discharged to the pressure existing inside the hull 72 through a small clearance annular passageway 154, which is formed between the shaft 10 and a circular bore 155 formed longituidnally through the sleeve 82. While this bore may be cylindrical, it is preferred to taper it from a larger diameter at the end communicating with the passage 109 to a smaller diameter at the opposite end 156 of the sleeve. The flow is drained to the oil cooler and the sump through a plurality of circumferentially spaced bores 157 formed in a flanged ring 158, which is threaded on the sleeve element 83 at 159, and through a radial passage 160 in communication with a threaded opening 161, which are formed in the end cap 76. By these means, hydraulic fluid under reduced pressure is also supplied to the clearance space 140. The functioning of the hydraulic circuit thus far described and of the sealing element 91 are substantially the same as the corresponding means in the embodiment of FIG. 1, and no further detailed description of their operation is believed necessary.

In order to prevent escape of the hydraulic fluid from the housing, a conventional resilient annular sealing element 162 is received within the ring 158 in circumferential relatively slidable engagement with the shaft. The sealing element 162 is retained in place by means of a flexible cap 165, which is secured to the end cap by means of screws 166, and is formed with a clearance opening 167 to permit lateral movement of the shaft.

Means are provided for hydraulically balancing the sleeve axially in the housing against the pressure of the sea water upon the axially projected area of the sleeve, which pressure exerts a force upon the sleeve to the left as viewed in FIG. 3. These means include a schematically illustrated hydraulic circuit for applying a pressure upon the surfaces 129 and 131 of the sleeve, in order to exert a counter-balancing force to the right as viewed in FIG. 3. The hydraulic circuit is closed and includes a conventional pressure accumulator, comprising a piston 168 slidably received in a cylinder 169 and exposed upon its opposite faces to the sea water and to the hydraulic fluid. The fluid pressure is communiacted to the surfaces 129 and 131 by means of a plurality of circular threaded openings 170, passages 171a and 171b in the end cap 76, passage 172 in the casing 75, and a plurality of circumferentially spaced cylindrical openings 173 and 174 formed in the disc assemblies 111 and 110, respectively. The cylindrical openings 174 are circumferentially spaced from the passage 147 and have no fluid communication therewith.

A plurality of cylindrical annular spacers 176, which are of a slightly smaller diameter than the cylindrical openings 173, are fitted within these openings to prevent crushing of the disc assemblies 111 by fluid pressures exerted radially thereon. Similarly, a spacer 177 is disposed within each cylindrical opening 174 for the same purpose. The clearance between the cylindrical spaces and the openings is very small, but is sufficient to permit fluid pressure to be communicated to the surfaces 129 and 131. A pair of balls 180 is loosely seated in opposite ends of the interior surface 181 of each of the spacers 176 and bear upon the opposite radial surfaces 128 and 129. These balls support the spacers within the openings 173. Similarly, a pair of balls 184 is received in opposite ends of an opening 185 in each spacer 177 of the disc assembly 110, and bear upon the surfaces 130 and 131. Leakage of fluid from the openings 173 and 174 to the clearance spaces 140, 141 and 142 around the rings 114, 115, 116 and 117 is prevented by means of a group of O-ring seals 191, 192, 193 and 194, which are received in suitable grooves formed in the sleeve.

By the means just described, hydraulic fluid pressure is exerted upon surfaces 129 and 131 to hydraulically counter-balance the axial force exerted by sea water pressure upon the sleeve. The sleeve is thus axially balanced in the housing by resilient and hydraulic means in such manner as to be free to follow random lateral and canting displacements of the shaft, upon which it is centered through the action of the regulated flow of hydraulic fluid through the passageway 154. The resilient disc assemblies 110 and 111 provide for this axial balancing, but at the same time seal the hydraulic fluid circuits from the sea water, which contacts an axial face of the sealing element 91 and enters the passage 142.

It will be apparent to those skilled in the art that various changes and modifications may be made in the embodiments which have been shown by way of illustration without departing from the spirit and scope of the invention. I therefore intend to cover all such changes and modifications in the appended claims.

What I claim and desire to secure by Letters Patent of the United States is:

1. A fluid seal for preventing flow of a pressurized fluid along a shaft to an area of lower pressure, said seal comprising, in combination; an annular sealing element circumferentially engaging the shaft in rotatable relationship and exposed to the pressurized fluid on one axial face thereof, means for supplying a flow of hydraulic fluid to the other axial face of said sealing element under a regulated pressure substantially equal to that of the pressurized fluid, and a sleeve spaced circumferentially about the shaft and forming an annular passageway therebetween, said passageway communicating with said other axial face of said sealing element at one end thereof to receive said flow of hydraulic fluid, said passageway communicating with the area of lower pressure at the other end thereof to deliver said flow of hydraulic fluid under the lower pressure, said passageway tapering from a larger diameter at said one end thereof to a smaller diameter at said other end thereof, said tapered passageway cooperating with said flow of hydraulic fluid therethrough to support said sleeve radially about the shaft.

2. A fluid seal adapted to prevent the flow of a pressurized fluid along a rotatable shaft passing through a wall separating the pressurized fluid from an area of lower pressure, said seal comprising, in combination; housing means circumferentially spaced about the shaft and mounted upon the wall, an annular sealing element circumferentially engaging the shaft in rotatable relationship and exposed to the pressurized fluid on one axial face thereof, means for supplying a flow of hydraulic fluid to the other axial face of said sealing element under a regulated pressure substantially equal to that of the pressurized fluid, a sleeve spaced circumferentially about the shaft and forming an annular passageway therebetween, means for supporting said sleeve axially in said housing to permit canting and radial movement of said sleeve with said shaft, said passageway communicating with said other axial face of said sealing element at one end thereof to receive the flow of hydraulic fluid, said passageway communicating at the other end thereof with the area of lower pressure to deliver the flow of hydraulic fluid under the lower pressure, said passageway tapering from a larger diameter at said one end thereof to a smaller diameter at said other end thereof, said tapered passageway cooperating with the flow of hydraulic fluid therethrough to support said sleeve radially about the shaft.

3. A fluid seal as recited in claim 2, said means for supporting said sleeve axially in said housing comprising a pair of resilient annular members axially abutting said sleeve upon surfaces formed thereon, said resilient members being supported in said housing.

4. A fluid seal as recited in claim 3, said pair of resilient members being axially spaced apart, said resilient members being axially interposed between said surfaces formed in said sleeve and surfaces formed in said housing, said housing and said sleeve being circumferentially spaced apart to permit canting and radial displacement of said sleeve with respect to said housing.

5. A fluid seal as recited in claim 2, said means for supporting said sleeve axially in said housing including at least two opposed surfaces formed in said sleeve and having projected areas upon planes radial to said sleeve, said surfaces being exposed, respectively, to the opposing pressures of the pressurized fluid and hydraulic fluid under a regulated pressure substantially equal to that of the pressurized fluid.

6. A fluid seal adapted to prevent the flow of a pressurized fluid along a rotatable shaft passing through an opening in a wall separating the pressurized fluid from an area of lower pressure, said seal comprising, in combination; a housing mounted upon the wall, means including an inlet in said housing for supplying a flow of hydraulic fluid to the interior of said housing under a regulated pressure substantially equal to that of the pressurized fluid, a sleeve located within said housing and spaced circumferentially about the shaft to form an annular passageway therebetween, a pair of resilient annular members spaced circumferentially about the shaft and axially interposed between radial surfaces of said sleeve and radial surfaces of said housing to support said sleeve axially in said housing for relative canting and transverse movement therebetween, an annular sealing element circumferentially engaging said shaft, said sealing element mounted in said sleeve and sealing said passageway from the opening in the wall, said sleeve formed with a first passage for supplying said flow of hydraulic fluid to an end of said passageway adqacent to said sealing element, said housing formed with a second passage communicating the other end of said passageway with the area of lower pressure to release said flow of hydraulic fluid from said housing at the lower pressure, one of said resilient members sealing off said flow of hydraulic fluid from communication with said opening in the wall.

7. A fluid seal as recited in claim 6, in which said passageway is tapered from a larger diameter at said end thereof adjacent to said sealing element to a smaller diameter at said other end thereof.

8. A fluid seal as recited in claim 6, said housing extending circumferentially about said annular members and being formed with axially tapered surfaces to engage the peripheries of each of said annular members about only one axial end thereof, said members extending circumferentially about said sleeve, said sleeve being formed with axially tapered surfaces such that said annular members engage the periphery of said sleeve at only the opposite ends of said annular members.

9. A fluid seal as recited in claim 6, in which said radial surfaces of said sleeve face in one axial direction and said radial surfaces of said housing face in the opposite axial direction, said resilient annular members each being formed with a plurality of circumferentially-spaced openings extending axially therethrough, and means for supplying hydraulic fluid under pressure through said openings to said surfaces of said sleeve to urge said sleeve in said other axial direction to balance said sleeve axially against pressure exerted in said one axial direction by the pressurized fluid.

10. A fluid seal as recited in claim 9, together with a plurality of annular spacers, each positioned within one of said openings and forming a small clearance for flow of hydraulic fluid therebetween, said spacers supporting said resilient annular members against crushing by differential hydraulic pressures exerted thereon.

11. A fluid seal as recited in claim 9, in which said resilient annular members each comprise an assembly of a plurality of resilient annular discs and a plurality of relatively rigid annular discs axially stacked in an alternating relationship, said resilient discs being bonded to said rigid discs and to said radial surfaces at abutting radial faces of said assembly.

References Cited in the file of this patent

UNITED STATES PATENTS 2,325,283     Swearingen             July 27, 1943
2,806,748     Krotz et al.             Sept. 17, 1957

OTHER REFERENCES

A.S.M.E. Transactions.